US008924771B2

(12) United States Patent
Unrein et al.

(10) Patent No.: US 8,924,771 B2
(45) Date of Patent: Dec. 30, 2014

(54) MASTER-SLAVE EXPANDER LOGGING

(71) Applicant: LSI Corporation, Milpitas, TN (US)

(72) Inventors: Jason A. Unrein, Wichita, KS (US);
Reid A. Kaufmann, Andover, KS (US);
Luiz D. Varchavtchik, Wichita, KS (US)

(73) Assignee: LSI Corporation, San Jose, CA (US)

( * ) Notice: Subject to any disclaimer, the term of this patent is extended or adjusted under 35 U.S.C. 154(b) by 216 days.

(21) Appl. No.: 13/707,195

(22) Filed: Dec. 6, 2012

(65) Prior Publication Data

US 2014/0164846 A1 Jun. 12, 2014

(51) Int. Cl.
G06F 11/00 (2006.01)
G06F 11/34 (2006.01)

(52) U.S. Cl.
CPC .................................. G06F 11/3476 (2013.01)
USPC ........................................................ 714/4.11

(58) Field of Classification Search
CPC .............................. G06F 3/0689; G06F 3/067
See application file for complete search history.

(56) References Cited

U.S. PATENT DOCUMENTS

| 7,738,397 | B2* | 6/2010 | Clayton | 370/254 |
| 8,797,918 | B1* | 8/2014 | Nguyen et al. | 370/255 |
| 2005/0080881 | A1* | 4/2005 | Voorhees et al. | 709/220 |
| 2006/0061369 | A1 | 3/2006 | Marks et al. | |
| 2010/0064085 | A1* | 3/2010 | Johnson et al. | 710/300 |
| 2013/0138851 | A1* | 5/2013 | Dominguez et al. | 710/300 |
| 2013/0304943 | A1* | 11/2013 | Pinglikar et al. | 710/15 |
| 2013/0336105 | A1* | 12/2013 | Myrah et al. | 370/216 |
| 2014/0032979 | A1* | 1/2014 | Singh | 714/48 |
| 2014/0173165 | A1* | 6/2014 | Madhusudana et al. | 710/316 |

* cited by examiner

Primary Examiner — Christopher McCarthy
(74) Attorney, Agent, or Firm — Suiter Swantz pc llo

(57) ABSTRACT

The invention provides a data storage topology that includes a master logging node where the event logs for all of the nodes may be stored on a consolidated basis. The master logging node is configured with a sufficient amount of reserved or additional data storage to accommodate the event logging requirement for the entire data storage topology. The other expanders in the topology may remain at a baseline model. The master logging medium may be an inexpensive persistent storage, such as a flash chip or USB key. The master logging expander may pull the event logs and other information from the remote expanders or, alternatively, the remote expanders may push their event logs and other information to the master logging node. In particular embodiments, the pull or push configuration may be implemented through preexisting SAS protocols.

24 Claims, 3 Drawing Sheets

MASTER-SLAVE EXPANDER LOGGING

TECHNICAL FIELD

The present invention relates to data storage systems for computer networks and, more particularly, to a master-slave consolidated event logging system for data storage topologies using SAS expanders.

BACKGROUND

Debugging embedded firmware defects in a customer's data storage environment presents many challenges. A particularly difficult challenge arises when adequate information, such as event logs providing error traces, cannot be captured to characterize and determine a root cause of a failure. The lack of diagnostic information can result in costly engineering time and the need for specialized equipment to emulate and reproduce the fault condition in order to diagnose and correct the underlying problem.

In some cases, however, the problems may not be easily reproduced, even by the customer. When sufficient debug data cannot be captured or reproduced, the root cause cannot be determined directly. In this scenario, the technicians must often resort to trial and error in an attempt to fix the undiagnosed problem. This type of "hit and miss" troubleshooting can be costly in terms of engineering time and customer satisfaction.

This problem has conventionally been alleviated by reserving or adding sufficient storage space to each data storage device or expander in the topology to allow each recordation of a robust amount of event logging information. With enough event log storage, a sufficient amount of history can usually be recorded to capture the problematic events as they arise. This approach is expensive, however, because it requires reserving or adding a significant amount of data storage capacity to each node in the storage topology for event data logging. In addition, error causing events can still be missed when the event is question does not halt operation of the system, which can result in the event log wrapping over the log for the event that caused the problem.

The existing event logging protocol has each expander maintain its own event log. When a problem arises, a technician typically gathers all of the logs from all of the expanders in the topology. The logs are then parsed individually or merged into a consolidated log for easier parsing. Operating systems help implement this type of event logging by exposing manual configurations that can be set to instruct each expander where to store its respective event log, allowing for consolidated ongoing event log storage. In the Linux operating system, for example, there is a "syslog-ng" program that allows an administrator to designate event logging data storage locations. This manual configuration protocol allows a user to specify logging storage locations for all (or certain log levels/types) of the event logs in a central server, where the event logs are typically consolidated into a single system log or stored a separate event log files for each individual expander. The central server can be configured to conveniently handle a large number of data storage expanders in any given data storage topology.

The conventional approach to event logging has a drawback, however, because this type of event logging system requires manual configuration on a node-by-node that has to be set up and managed by a system administrator. This requires engineering time and specialized knowledge of a trained system administrator to implement and manage the event logging system. There is, therefore, a continuing need for methods and systems for improving the event logging for data storage topologies. More particularly, there is a need for avoiding the need for specialized, node-by-node administration to set up and manage the event logs for expanders in data storage topologies.

SUMMARY

The needs described above are met by employing a single expander in a data storage topology to serve as a master logging node where the event logs for all of the nodes may be stored on a consolidated basis. The single master node (also referred to as the master expander) is configured with a sufficient amount of reserved or additional data storage (master logging medium) to accommodate event logging for the entire data storage topology. This allows all of the other expanders (also referred to as remote or basic expanders) in the topology to remain at a baseline model. The master logging medium may be inexpensive persistent storage, such as a flash chip or USB key. The master expander may be configured to pull the event logs and other information from the remote expanders or, alternatively, the remote expanders may be configured to push their slave event logs and other information to the master node. In particular embodiments, the pull or push configuration may be implemented through pre-existing SAS protocols.

As one example, the critical event logs for a cloud of expanders may be merged into a consolidated master expander log maintained on the master logging node. In addition, the master logging node may be configured to automatically detect a new remote expander added to the data storage topology and initiate log pulling from the newly connected logging device. A master logging node may also be added to an existing data storage topology and be configured to automatically poll the remote expanders in the topology, set up a push or pull consolidated logging protocol for the topology, and automatically initiate consolidated event logging for the network.

As an optional feature, the consolidated event logs may be maintained on a removable, persistent data storage medium, such as a USB memory key, SD card, or even a SAS drive. This allows any user, such as the system administrator, to remove and replace the storage device containing the data log from the master logging node at any time. After the logging medium has been removed, the master node may automatically create a new log on the newly inserted storage device. The master logging node may be configured to maintain a consolidated log for the entire topology, or maintain separate logs for individual nodes, levels or other groups of nodes, as desired. Similarly, the remote expanders may be configured to maintain their logs locally, remotely, or to log locally and log remotely at the same time, as desired. A remote node may also be configured to detect when a master logging node is present, and to maintain its own event log local only when the master logging node is absent.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

The invention may be embodied in a master-slave event logging system for a data storage topology for a host computer system or network. Rather than having each expander maintain its own event log, one of the expanders may be designated as a "master expander" which may also be referred to as the "master node." The master node includes a data storage medium (master logging medium) for storing the event logs for the entire topology or a subset of the entire topology, if desired. In particular, the master logging medium may be a persistent, removable data storage device, such as a USB key, SD card or detachable SAS drive. The other expanders of the topology may be referred to as "remote," "slave" or "basic" expanders. The remote expander may, but need not, be configured to maintain its own local event log (slave event log). In particular, the remote expander may be configured to detect when a master node is present, and to maintain its event log locally only when a master node is absent.

Figure 1:
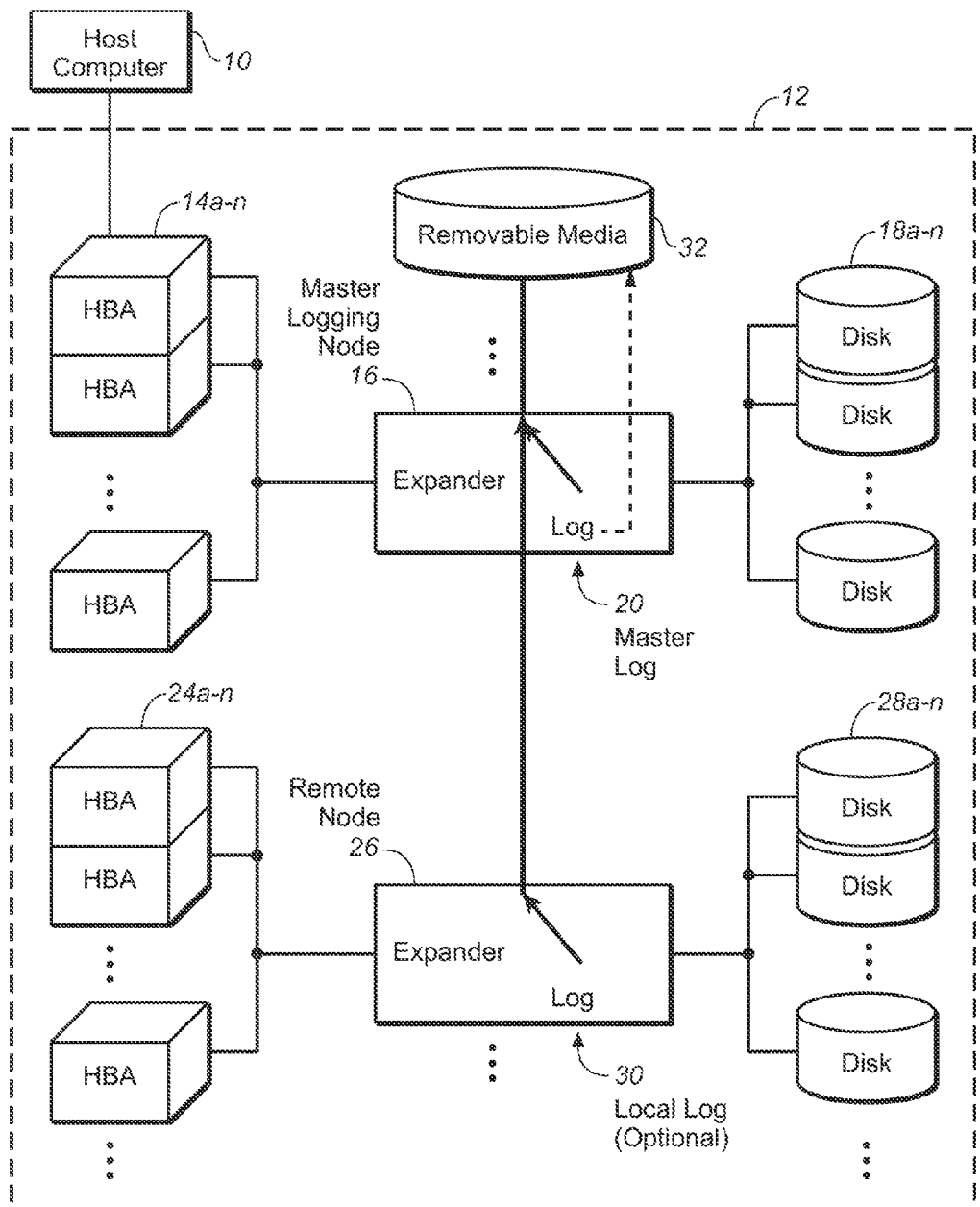
FIG. 1 is a block diagram of a typical data storage topology including a master-slave event logging system.

A basic configuration illustrating the operation of the invention is illustrated in FIG. 1, which is a block diagram of a host computer 10 connected to a typical data storage topology 12 that has a master logging node 16 and a slave node 26. While it will be understood that this is a simplified example of the kind of system or network in which the invention may be employed, it will also be understood that the elements shown are sufficient to illustrate the operating principles of the invention. The illustrative data storage topology 12 includes a number of host bus adapters (HBAs) that are organized into groups, represented by the HBA groups 14a-n and 24a-n. Each group of HBAs is connected to a respective SAS expander which, in turn, is connected to a number of data storage devices. As one specific application, the data storage devices connected to a particular expander may implement a RAID data storage system. For the simplified example shown in FIG. 1, the first HBA group 14a-n is connected to the first SAS expander 16, which is connected to the first set of data storage devices 18a-n. Similarly, the second HBA group 24a-n is connected to the second SAS expander 26, which is connected to the first set of data storage devices 28a-n.

In this particular example, the first SAS expander 16 serves as the master logging node which includes the master event log 20 maintaining the event logs for the first and second expanders 16 and 26. The second SAS expander 18 need not include an event log or it may optionally include a local event log 30, which may optionally be used to store a local event log (slave log) only when the master logging expander 16 is absent, for example when the master logging node 16 is off line or when the master logging medium has been removed. During ordinary operations when the master logging medium is present at the master logging node 16, the master event log 20 maintains the event logs for both expanders 16 and 26 to facilitate troubleshooting of errors that may occur in either expander or their associated data storage devices. The master logging medium may be a persistent, removable data storage device 32, such as a USB key, SD card or detachable SAS drive.

Figure 2:
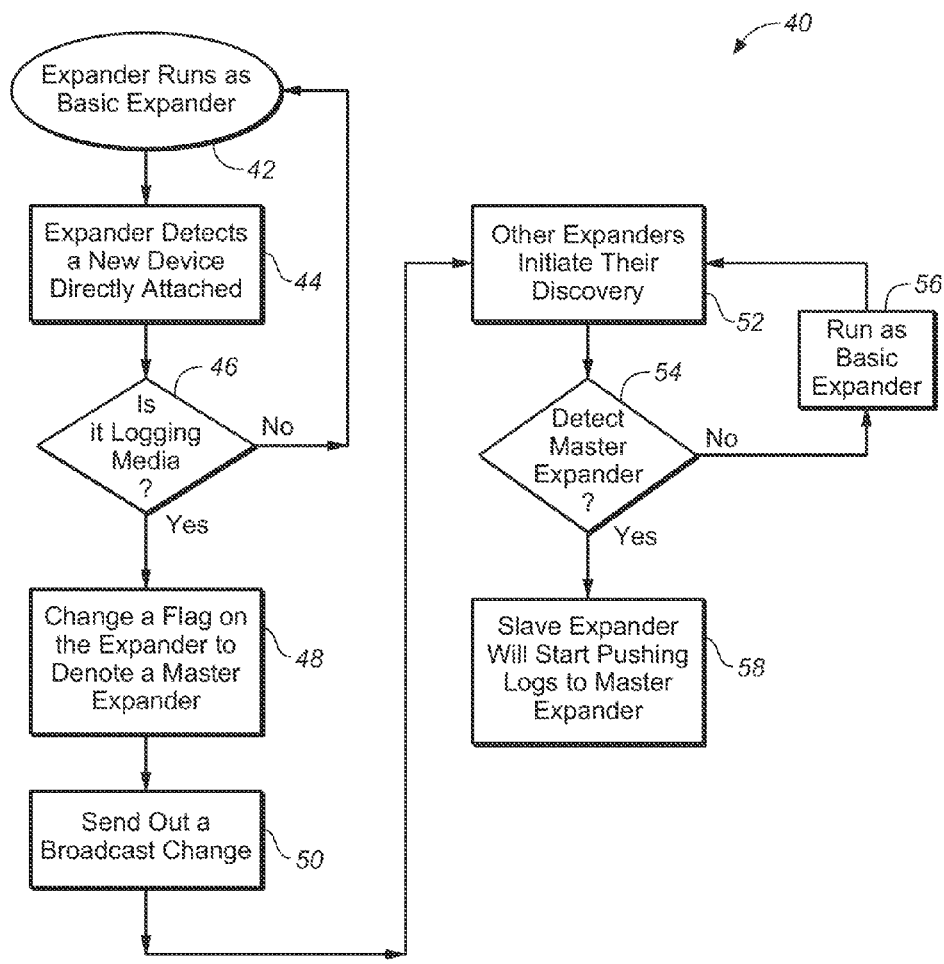
FIG. 2 is a logic flow diagram for a master-slave push protocol for the master-slave event logging system.

The data storage topology may be originally configured with a master-slave event logging topology. In addition, an existing data storage system may be converted to or from the master-slave event logging topology at any time. FIG. 2 is a logic flow diagram illustrating a routine 40 for converting a basic expander system to a master-slave event logging system using a push protocol. A user such as the administrator may initiate the conversion to a master-slave event logging system at any time by attaching a master logging data storage medium to a selected one of the basic expanders in the topology, which has been designated to serve as the master logging node. In step 42, the expander to be converted into the master logging node is operating as a basic expander (i.e., prior to conversion to operating as the master logging node). Step 42 is followed by step 44, in which the expander detects that a new device has been directly attached. Step 44 is followed by step 46, in which the expander determines whether the newly attached device is a master logging medium to be used to maintain a master event log. For example, the expander may receive this information through user input or it may be configured to automatically recognize certain types of media, such as a USB key or SD card, as a master logging medium. Alternatively, the master logging medium may be configured with "plug and play" functionality that automatically instructs an expander receiving the medium that it has received the master logging medium. The master logging medium may also provide the expander with required operating instructions or data to necessary to configure the expander to serve as the master logging node.

If the expander does not detect a master logging medium, the 'No" branch is followed from step 46 to step 42, in which the expander continues to operate as a basic expander. But if the expander does detect that the master logging medium (e.g. medium is valid and acceptable), the 'Yes" branch is followed from step 46 to step 48, in which the expander transitions to a master logging expander by setting an internal flag, which may be visible to the other expanders, denoting itself as the master logging node. Step 48 is followed by step 50, in which the newly denoted master logging expander issues a "broadcast change" across the data storage topology to notify all other basic expanders that a change has occurred.

Step 50 is followed by step 52, in which the other expanders initiate a discovery process, such as a standard SAS discovery process. Step 52 is followed by step 54, in which the other basic expanders detect master logging expander to verify the change, for example by checking the master node flags on the other expanders in the topology looking for a flag that is set to designate the corresponding expander as the master logging node. As another option, the expander may issue a query, such as a vendor specific query, to the other expanders (or to only the specific expander that initially broadcast itself as the master logging node) to verify the presence and identity of the master logging expander. If the basic expander does not detect the master logging expander to verify the change, the "No" branch is followed from step 54 to step 56, in which the basic expander continues to run as a basic expander maintaining its event log locally. Step 55 may loop back to step 52, in which the basic expander may again (e.g., periodically) attempt to detect a master logging expander. If the basic expander detects the master logging expander to verify the change, the "Yes" branch is followed form step 54 to step 58, in which the basic expander begins pushing its event logs to the master logging node. Step 58 may also loop back to step 52, in which the basic expander may again (e.g., periodically) attempt to detect a master logging expander to verify that the master node continues to be present. In the event that the basic expander determines that the master logging expander is not present, it goes to step 56, in which the basic expander returns to operating as a basic expander maintaining its event log locally. To augment this procedure, the master logging node may unset its master logging bit whenever the master logging medium is removed to allow the basic expander to discover that the previously enabled master logging expander is no longer operating as a master logging expander.

In a particular embodiment operating in as SAS environment, the basic expander automatically begins to operate as a slave expander in response to detecting presence of the master expander by transmitting its slave event log to the master expander while optionally or temporarily logging locally to its internal ring buffer to provide a safeguard in the event that the master log is lost. In addition, the master expander begins storing the slave log as part of the master log on the master logging medium in an ordered timestamp method. This will require the master expander to cache a small amount of logs from each slave expander. The slave logs may be combined with the master node's own event log to create a consolidated log, the master node may store the event log for each node separately, or various combinations of log groups or levels may be maintained, as desired. The master-slave push process ordinarily continues until a terminal problem occurs that prevents logging, a broadcast change occurs, or the master expander is not detected, for example if the master node goes off line or the master logging medium is removed. In the event that the master logging stops, each slave expander returns to locally logging to its internal ring buffer until a time when it can resume pushing logs to the master expander.

Figure 3:
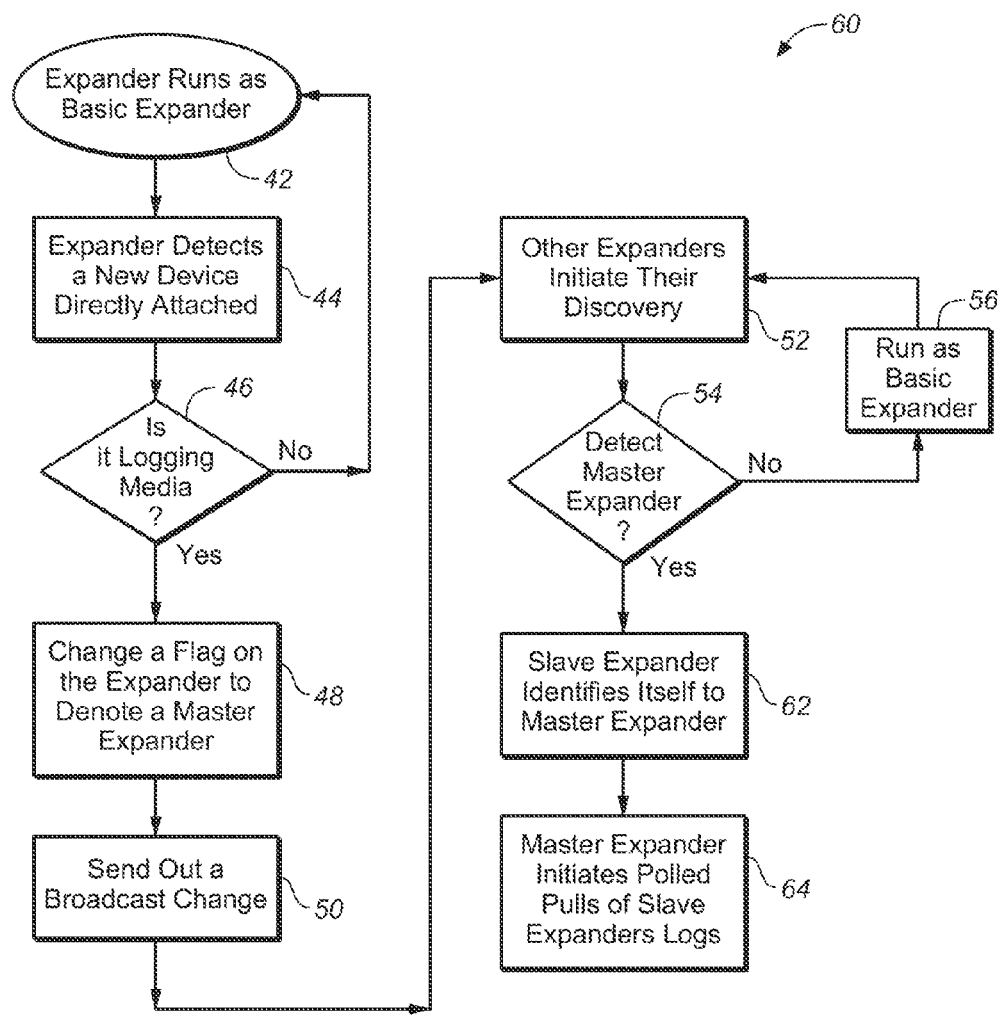
FIG. 3 is a logic flow diagram for a master-slave pull protocol for the master-slave event logging system.

FIG. 3 is a logic flow diagram illustrating a routine 60 for converting a basic expander system to a master-slave event logging system using a pull protocol. Steps 42 through 56 may be the same as shown in FIG. 2, with step 58 shown in FIG. 2 replaced by steps 62 and 64 shown in FIG. 3. In step 62, the basic expander begins operating as a slave expander by identifying itself to the master expander, for example with a broadcast change. The master expander maintains a list of slave expanders and regularly polls the slave expanders for log data. The slave expander logs events to its internal ring buffer while maintaining an index of what has been transmitted to the master expander. Step 62 is followed by step 64, in which the master expander initiates a polled pull of the event log from the slave expander. The slave expander responds to the poll by sending its slave event log to the master expander. The slave expander may then purge the transferred data from its local event log or maintain the transferred data in the local log to provide a backup copy.

This pulled logging process will ordinarily continue until a terminal problem occurs that prevents logging, a broadcast change occurs, or the master expander is not detected. In the event that the master logging stops, each slave expander returns to locally logging to its internal ring buffer until a time when it can resume pushing logs to the master expander.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. A master-slave event logging system for a data storage topology, comprising:
   a plurality data storage expanders, each connected to a respective plurality of data storage devices;
   a first one of the data storage expanders configured as a master logging node with a master logging medium operative for storing a master event log comprising event logs for the plurality data storage expanders; and
   a second one of the data storage expanders configured as a slave node operative for transmitting its slave event log to the master logging node where it is stored as part of the master event log, wherein the slave node is operative to push the slave event log to master logging node.

2. The master-slave event logging system of claim 1, wherein the master logging node is operative to pull the slave event log from the slave node.

3. The master-slave event logging system of claim 1, wherein the slave node is further operative to store a local copy of the slave event log that has also been transmitted to the master logging node.

4. The master-slave event logging system of claim 1, wherein the slave node is further operative to store a local copy of the slave event log in response to detecting absence of the master logging node.

5. The master-slave event logging system of claim 1, further comprising a persistent, removable computer storage medium for storing the master event log at the master logging node.

6. The master-slave event logging system of claim 1, wherein the slave node is further configured to automatically initiate transmission of the slave event log to the master logging node upon detecting presence of the master logging node.

7. The master-slave event logging system of claim 1, wherein the master logging node is further configured to automatically initiate master event logging in response to detecting a master logging medium attached to the master logging node.

8. The master-slave event logging system of claim 1, wherein the slave node is further configured to automatically discontinue local storage of the slave event log in response to detecting presence of the master logging node and to automatically resume local storage of the slave event log in response to detecting absence of the master logging node.

9. A method for logging events in a data storage topology comprising a plurality of data storage expanders, each connected to a respective plurality of data storage devices, comprising the steps of:
   configuring a first one of the data storage expanders as a master logging node with a master logging medium;
   storing a master event log at the master logging node comprising event logs for the plurality data storage expanders;
   configuring a second one of the data storage expanders as a slave node;
   transmitting a slave event log from the slave node to the master logging node and storing the slave event log as part of the master event log; and
   storing a local copy of the slave event log at the slave node in response to detecting absence of the master logging node.

10. The method of claim 9, further comprising the step of pushing the slave event log from the slave node to the master logging node.

11. The method of claim 9, further comprising the step of pulling the slave event log to the master logging node from the slave node.

12. The method of claim 9, further comprising the step of storing a local copy of an event log at the slave node that has also been transmitted to the master logging node.

13. The method of claim 9, further comprising the step of storing the master event log at the master logging node in a persistent, removable computer storage medium.

14. The method of claim 9, further comprising the step of automatically initiating transmission of the slave event log from the slave node to the master logging node in response to detecting presence of the master logging node.

15. The method of claim 9, further comprising the step of automatically initiating master event logging at the master logging node in response to detecting a master logging medium attached to the master logging node.

16. The method of claim 9, further comprising the steps of automatically discontinuing local storage of the slave event log in response to detecting presence of the master logging node and automatically resuming local storage of the slave event log in response to detecting absence of the master logging node.

17. A non-transitory computer storage medium comprising computer executable instructions for logging events in a data storage topology comprising a plurality data storage expanders, each connected to a respective plurality of data storage devices, comprising the steps of:
   storing a master event log at a master logging node comprising event logs for the plurality data storage expanders;

transmitting a slave event log from a slave node to the master logging node and storing the slave event log as part of the master event log, wherein the computer executable instructions further comprise the step of storing the master event log at the master logging node in a persistent, removable computer storage medium.

18. The computer storage medium of claim 17, wherein the computer executable instructions further comprise the step of pushing the slave event log from the slave node to the master logging node.

19. The computer storage medium of claim 17, wherein the computer executable instructions further comprise the step of pulling the slave event log to the master logging node from the slave node.

20. The computer storage medium of claim 17, wherein the computer executable instructions further comprise the step of storing a local copy of an event log at the slave node that has also been transmitted to the master logging node.

21. The computer storage medium of claim 17, wherein the computer executable instructions further comprise the step of storing a local copy of the slave event log at the slave node in response to detecting absence of the master logging node.

22. The computer storage medium of claim 17, wherein the computer executable instructions further comprise the step of automatically initiating transmission of the slave event log from the slave node to the master logging node in response to detecting presence of the master logging node.

23. The computer storage medium of claim 17, wherein the computer executable instructions further comprise the step of automatically initiating master event logging at the master logging node in response to detecting a master logging medium attached to the master logging node.

24. The computer storage medium of claim 17, wherein the computer executable instructions further comprise the steps of automatically discontinuing local storage of the slave event log upon detecting presence of the master logging node and automatically resuming local storage of the slave event log upon detecting absence of the master logging node.

* * * * *